United States Patent
Pan et al.

(10) Patent No.: US 9,385,645 B2
(45) Date of Patent: Jul. 5, 2016

(54) METHODS AND SYSTEMS FOR ELECTRICAL DC GENERATION

(71) Applicant: ABB Technology AG, Zurich (CH)

(72) Inventors: Zhiguo Pan, Cary, NC (US); Darren Dale Tremelling, Cary, NC (US)

(73) Assignee: ABB TECHNOLOGY AG, Zurich (CH)

( * ) Notice: Subject to any disclaimer, the term of this patent is extended or adjusted under 35 U.S.C. 154(b) by 25 days.

(21) Appl. No.: 14/016,021

(22) Filed: Aug. 30, 2013

(65) Prior Publication Data

US 2015/0061606 A1 Mar. 5, 2015

(51) Int. Cl.
*H02P 9/00* (2006.01)
*H02M 7/10* (2006.01)
*H02M 7/19* (2006.01)
*H02P 9/48* (2006.01)
*H02M 1/00* (2006.01)

(52) U.S. Cl.
CPC .............. *H02P 9/008* (2013.01); *H02M 7/10* (2013.01); *H02M 7/19* (2013.01); *H02P 9/48* (2013.01); *H02M 2001/0077* (2013.01); *H02M 2001/0093* (2013.01)

(58) Field of Classification Search
USPC .................................... 322/24, 28, 20, 44, 59
See application file for complete search history.

(56) References Cited

U.S. PATENT DOCUMENTS

| | | | |
|---|---|---|---|
| 4,695,776 A * | 9/1987 | Dishner et al. ................ 318/14 |
| 5,781,428 A | 7/1998 | Paice | |
| 6,031,738 A | 2/2000 | Lipo et al. | |
| 6,762,945 B2 * | 7/2004 | Morgen ........................ 363/17 |
| 6,788,029 B1 * | 9/2004 | Gabrys ......................... 322/4 |
| 6,850,032 B1 | 2/2005 | Peterson | |
| 7,714,583 B2 | 5/2010 | Zhu et al. | |
| 7,977,819 B2 * | 7/2011 | Kitanaka ....................... 307/64 |
| 8,174,138 B2 | 5/2012 | Castelli Dezza et al. | |
| 8,212,371 B2 | 7/2012 | Maibach et al. | |
| 2004/0189251 A1 | 9/2004 | Kutkut et al. | |

(Continued)

FOREIGN PATENT DOCUMENTS

| | | |
|---|---|---|
| EP | 2 096 732 A1 | 9/2009 |
| WO | WO 2015/030883 A2 | 3/2015 |

OTHER PUBLICATIONS

Non-Final Office Action for U.S. Appl. No. 14/016,018 (Apr. 17, 2015).

(Continued)

*Primary Examiner* — Julio Cesar Gonzalez Ramirez
(74) *Attorney, Agent, or Firm* — Jenkins, Wilson, Taylor & Hunt, P.A.

(57) ABSTRACT

An electrical DC generation system is disclosed. According to one aspect, a system for electrical DC generation system includes an electrical machine, having a positive output terminal and a negative output terminal, a plurality of stator windings, a plurality of passive rectifiers connected to the plurality of stator windings, the plurality of passive rectifiers being connected in series to form an intermediate bus having a positive terminal and a negative terminal. The system also includes a DC-DC converter circuit having input terminals connected to the positive and negative terminals of the intermediate bus and having output terminals electrically isolated from the input terminals and connected in series with the intermediate bus. The DC-DC converter output voltage is adjusted to regulate torque of the electrical machine by adjusting stator current of the electrical machine.

29 Claims, 6 Drawing Sheets

(56) References Cited

U.S. PATENT DOCUMENTS

| | | | |
|---|---|---|---|
| 2005/0286279 | A1 | 12/2005 | Datta et al. |
| 2008/0103632 | A1* | 5/2008 | Saban et al. .................. 700/286 |
| 2008/0273353 | A1* | 11/2008 | Rumpf ............................ 363/15 |
| 2009/0212568 | A1 | 8/2009 | Maibach et al. |
| 2009/0273956 | A1 | 11/2009 | Castelli Dezza et al. |
| 2009/0302788 | A1* | 12/2009 | Mitsuda et al. ............... 318/376 |
| 2010/0133816 | A1 | 6/2010 | Abolhassani et al. |
| 2010/0142234 | A1 | 6/2010 | Abolhassani et al. |
| 2011/0089693 | A1 | 4/2011 | Nasiri |
| 2011/0199033 | A1 | 8/2011 | Abolhassani et al. |
| 2011/0310642 | A1 | 12/2011 | Dai et al. |
| 2012/0119586 | A1* | 5/2012 | Carralero et al. ............... 307/82 |
| 2012/0133419 | A1 | 5/2012 | Frey et al. |
| 2012/0262954 | A1 | 10/2012 | Duvnjak |
| 2012/0280571 | A1 | 11/2012 | Hargis |
| 2013/0320778 | A1* | 12/2013 | Hopf et al. .................... 307/130 |
| 2015/0061607 | A1 | 3/2015 | Pan et al. |

OTHER PUBLICATIONS

Notification of Transmittal of the International Search Report and the Written Opinion of the International Searching Authority, or the Declaration for International Patent Application No. PCT/US2014/044399 (Feb. 12, 2015).

Zhang et al., "PMSG based Multi-Generator Architecture for Wind Generation Application," 2011 6th IEEE Conference on Industrial Electronics and Applications (ICIEA), pp. 335-340 (Jun. 21, 2011).

Lin et al., "A Generic Digital Model of Multiphase Synchronous Generator for Shipboard Power System," pp. 348-355, ESTS 2007, IEEE (2007).

Hansen et al., "Conceptual survey of Generators and Power Electronics for Wind Turbines," Risø-R-1205(EN), Risø National Laboratory, pp. 1-108 (Dec. 2001).

Notification of Transmittal of the International Search Report and the Written Opinion of the International Searching Authority, or the Declaration for International Patent Application No. PCT/US2014/037830 (Jun. 9, 2015).

Final Office Action for U.S. Appl. No. 14/016,018 (Oct. 26, 2015).

Non-Final Office Action for U.S. Appl. No. 14/016,018 (Feb. 29, 2016).

le Roux et al., "Digital Control of an Integrated Series Active Filter and Passive Rectifier with Voltage Regulation," IEEE Proceedings of the Power Conversion Conference, vol. 1, pp. 68-73 (2002).

* cited by examiner

FIG. 1

200 — PROVIDE AN ELECTRICAL MACHINE HAVING A POSITIVE OUTPUT TERMINAL AND A NEGATIVE OUTPUT TERMINAL, MULTIPLE STATOR WINDINGS, MULTIPLE PASSIVE RECTIFIERS CONNECTED TO THE STATOR WINDINGS AND CONNECTED IN SERIES TO FORM AN INTERMEDIATE BUS HAVING A POSITIVE TERMINAL AND A NEGATIVE TERMINAL, AND A DC-DC CONVERTER CIRCUIT HAVING INPUT TERMINALS CONNECTED TO THE POSITIVE AND NEGATIVE TERMINALS OF THE INTERMEDIATE BUS AND HAVING OUTPUT TERMINALS ELECTRICALLY ISOLATED FROM THE INPUT TERMINALS, A FIRST OUTPUT TERMINAL BEING CONNECTED TO THE POSITIVE TERMINAL OF THE INTERMEDIATE BUS

202 — ADJUST THE DC-DC CONVERTER OUTPUT VOLTAGE TO REGULATE TORQUE OF THE ELECTRICAL MACHINE BY ADJUSTING STATOR CURRENT OF THE ELECTRICAL MACHINE

METHODS AND SYSTEMS FOR ELECTRICAL DC GENERATION

TECHNICAL FIELD

The subject matter described herein relates to methods and systems for generation of direct current (DC) power. More particularly, the subject matter described herein relates to methods and systems for electrical DC generation suitable for generators that operate at varying speeds.

BACKGROUND

Historically, power companies use large synchronous generators to provide alternating current (AC) power to the power grid. Traditionally, these generators are 3-phase sinusoidal AC designed for a 3-phase AC grid. These generators, which are often powered by steam or gas turbines fueled by coal, oil, natural gas, or nuclear power, are typically operated at a constant speed because the frequency of electrical network is fixed. Even for the applications where DC power is required, a 3-phase AC generator is used along with a 3-phase rectifier to convert the AC power to DC power. If a simple passive diode rectifier is used, the rectifier introduces significant harmonic current and causes rotor losses and torque ripple. In addition, a simple rectifier does not have high fidelity control capability of regulating torque and voltage.

As interest in alternative sources of energy increases, interest in wind power has risen. Wind generators, however, must operate under varying wind conditions and thus suffer large variations in speed. In order to maximize power output of a wind generator across a range of operating speeds, the torque of the generator is regulated or adjusted depending on the present wind/rotor speed, e.g., by adjusting coil voltages and currents.

In conventional wind generators, the control system performs maximum power point tracking (MPPT) by regulating the electromagnetic torque through pulse width modulation (PWM) switching. However, this requires active rectifiers that are more costly, less efficient, and less reliable than the simple diode rectifiers that can be used in constant-speed conventional generators. In addition, simple diode or thyristor rectifiers do not have sufficient bandwidth control capability to regulate torque or DC voltage under the varying conditions in which wind generators typically operate.

Multiphase winding electric machines allow passive rectifiers to be used without introducing the torque ripple and additional rotor losses that are commonly present in simple diode or thyristor rectifiers. However, it is difficult to control torque and voltage with passive rectifiers, and for this reason their use is typically limited to field wound synchronous machines and fixed speed operation. Passive rectification is not well suited for use with wind generators. One reason is that wind generators have a large speed variation, e.g., from 50% to 100% of nominal speed. As a result, the output voltage in the low speed range is too low and needs to be boosted to nominal voltage so that a high-fidelity grid-side inverter control can be utilized. Another reason is that typical wind generators are permanent magnet generators, which means that the rotor flux cannot be changed. As a result, it is difficult to control torque using passive rectifiers. Active rectification is needed, which requires some form of control input, usually provided by a DC-DC converter.

There are disadvantages to active rectification, however. A common approach is to add a DC-DC converter to regulate torque and DC voltage, but conventional approaches require that the DC-DC converter be rated at full power, i.e., that the DC-DC converter not only operate correctly when the wind speed—and thus the output voltage of the wind generator—is low, but also be able to operate correctly when the wind speed and output voltage of the wind generator is high. Such DC-DC converters tend to be very complicated and correspondingly expensive.

Accordingly, in light of these disadvantages, there exists a need for methods and systems for electrical DC generation suitable for generators that operate at varying speeds.

SUMMARY

According to one aspect, the subject matter described herein includes a system for electrical DC generation. The system includes an electrical machine having multiple stator windings, multiple passive rectifiers connected to the stator windings, the passive rectifiers being connected in series to form an intermediate bus having a positive terminal and a negative terminal. The system also includes a DC-DC converter circuit having input terminals connected to the positive and negative terminals of the intermediate bus and having output terminals electrically isolated from the input terminals and connected in series with the intermediate bus. The DC-DC converter output voltage is adjusted to regulate torque of the electrical machine by adjusting stator current of the electrical machine.

According to another aspect, the subject matter described herein includes a method for electrical DC generation. The method includes providing an electrical machine having a positive output terminal and a negative output terminal, multiple stator windings, multiple passive rectifiers connected to the stator windings, the rectifiers connected in series to form an intermediate bus having a positive terminal and a negative terminal. The method also includes providing a DC-DC converter circuit having input terminals connected to the positive and negative terminals of the intermediate bus and having output terminals electrically isolated from the input terminals, which is connected in series with the intermediate bus. The method also includes adjusting the DC-DC converter output voltage to regulate torque of the electrical machine by adjusting stator current of the electrical machine.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for electrical DC generation. The subject matter disclosed herein is directed to a new system structure having a modular DC-DC converter with a fractional of system power rating, and is well-suited as a replacement for conventional three-phase generator and active rectifier systems currently being used in wind, marine and other applications. We present an integrated generator/converter system in which the main rectifier uses passive devices, such as diodes and thyristors, to reduce losses and increase reliability, in conjunction with a DC-DC converter with a reduced power rating to regulate DC voltage and therefore torque of the passively rectified DC generator.

Reference will now be made in detail to exemplary embodiments of the present invention, examples of which are illustrated in the accompanying drawings. Wherever possible, the same reference numbers will be used throughout the drawings to refer to the same or like parts.

Figure 1:
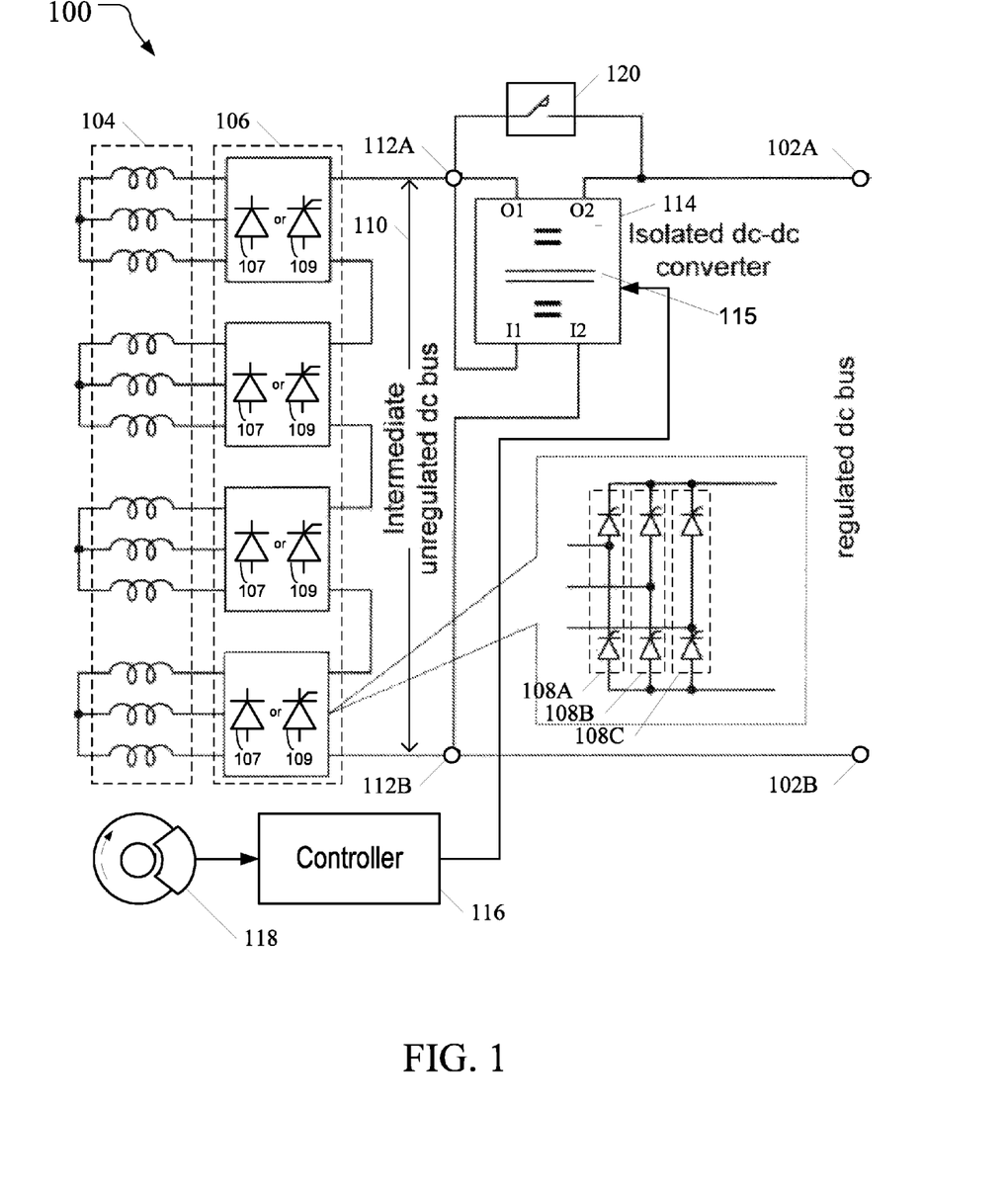
FIG. 1 is a block diagram illustrating an exemplary system for electrical DC generation according to an embodiment of the subject matter described herein.

FIG. 1 is a block diagram illustrating an exemplary system for electrical DC generation according to an embodiment of the subject matter described herein. In the embodiment illustrated in FIG. 1, the system includes an electrical machine 100 having a positive output terminal 102A and a negative output terminal 102B, multiple stator windings 104, and multiple passive rectifiers 106 connected to the stator windings 104.

In the embodiment illustrated in FIG. 1, electrical machine 100 has four sets of coils, each set in a three-phase configuration, but other configurations are possible. Alternative embodiments of electrical machine 100 include, but are not limited to electrical machines having single phase windings, electrical machines having multi-phase windings (defined here as windings having more than three phases), field-wound synchronous electrical machines, permanent magnet electrical machines, self-excited squirrel cage induction electrical machines, doubly-fed induction electrical machines, DC machines, machines within windings having integer or fractional slots per pole per phase, and other types of electrical machines.

Rectifiers 106 may include passive devices, such as diodes 107, and/or half-controlled devices, such as thyristors 109. In one embodiment, each rectifier 106 includes multiple sets of diodes and/or thyristors 109 for rectifying the AC voltages and currents from the winding coils to produce a DC output. In the embodiment illustrated in FIG. 1, for example, each rectifier 106 includes three separate half-wave bridges 108A, 108B, and 108C, one for each of the three coils in a three-phase set, wired in parallel.

Rectifiers 106 are connected in series to form an intermediate bus 110 having a positive terminal 112A and a negative terminal 112B. In one embodiment, negative terminal 112B is connected to negative output terminal 102B. In the embodiment illustrated in FIG. 1, for example, the four rectifiers 106 are wired in series to create intermediate bus 110. Electrical machine 100 includes a DC-DC converter circuit 114 having input terminals I1 and I2 respectively connected to positive terminal 112A and negative terminal 112B of intermediate bus 110, and having output terminals O1 and O2 that are electrically isolated from input terminals I1 and I2. Output terminal O1 is connected to positive terminal 112A of intermediate bus 100. In one embodiment, output terminal O2 is connected to positive output terminal 102A. The DC-DC converter includes a transformer 115. The output of the DC-DC converter can also be connected to negative DC bus, between 112B and 102B.

During operation of electrical machine 100, the output voltage of DC-DC converter 114 is adjusted to regulate torque of the electrical machine by adjusting stator current of electrical machine 100 in response to present or changing operating conditions of electrical machine 100. Changing the output voltage of DC-DC converter 114 changes the output voltage present across output terminals 102A and 102B, which changes the current through the stator, which in turn changes the torque of electrical machine 100.

In one embodiment, the torque of electrical machine 100 is adjusted to provide maximum power output for a given rotor speed, which may be performed according to a maximum power point tracking (MPPT) algorithm 130, for example. In one embodiment, electrical machine 100 may include a hardware controller 116 for this purpose. In one embodiment, controller 116 may receive input from a rotor speed or position sensor 118.

In one embodiment, electrical machine 100 may include a bypass switch 120 connected between the output terminals of DC-DC converter 114, such that in the closed position, switch 120 shorts the output voltage across output terminals O1 and O2 of converter 114, which operates to bypass converter 114. In the open position, switch 120 does not bypass DC-DC converter 114. In one embodiment, switch 120 is closed when electrical machine 100 is operating at full speed (or above some threshold speed) and no voltage boost is needed from converter 114. When converter 114 is bypassed, half-controlled device the rectifier 106 can still provide some controllability of the torque.

Figure 2:
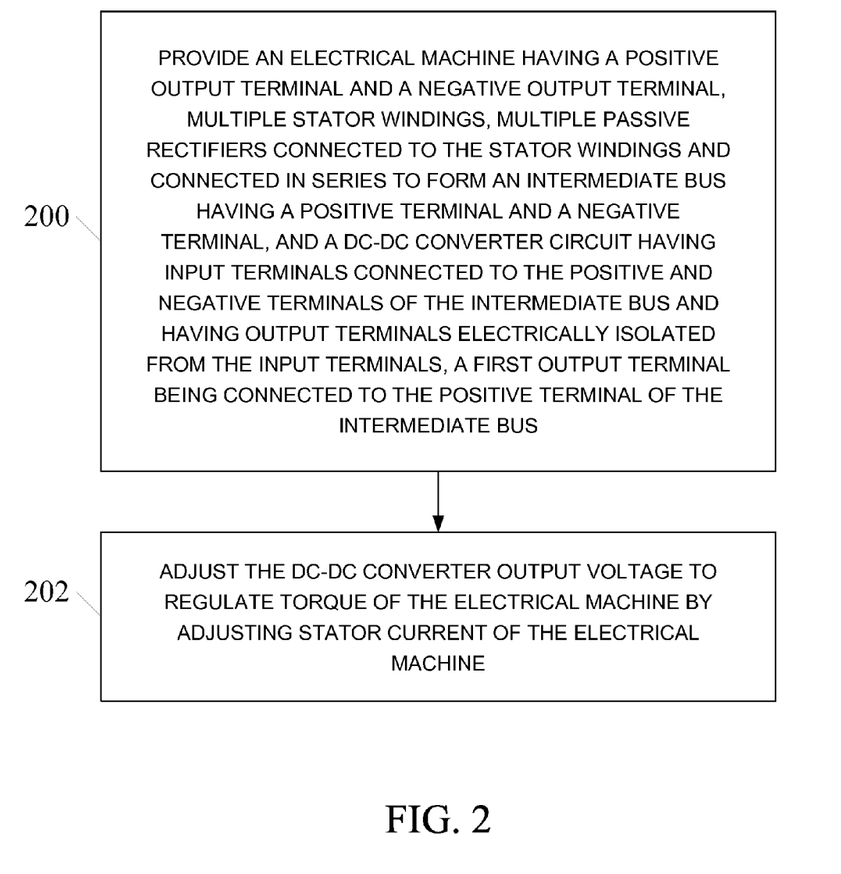
FIG. 2 is a flow chart illustrating an exemplary process for electrical DC generation according to an embodiment of the subject matter described herein.

FIG. 2 is a flow chart illustrating an exemplary process for electrical DC generation according to an embodiment of the subject matter described herein. In the embodiment illustrated in FIG. 2, the method includes, at step 200, providing an electrical machine having a positive output terminal and a negative output terminal, multiple stator windings, multiple passive rectifiers connected to the stator windings and connected in series to form an intermediate bus having a positive terminal and a negative terminal, and a DC-DC converter circuit having input terminals connected to the positive and negative terminals of the intermediate bus and having output terminals electrically isolated from the input terminals, a first output terminal being connected to the positive terminal of the intermediate bus.

Step 202 includes adjusting the DC-DC converter output voltage to regulate torque of the electrical machine by adjusting stator current and output voltage present at output terminals of the electrical machine.

Figure 3:
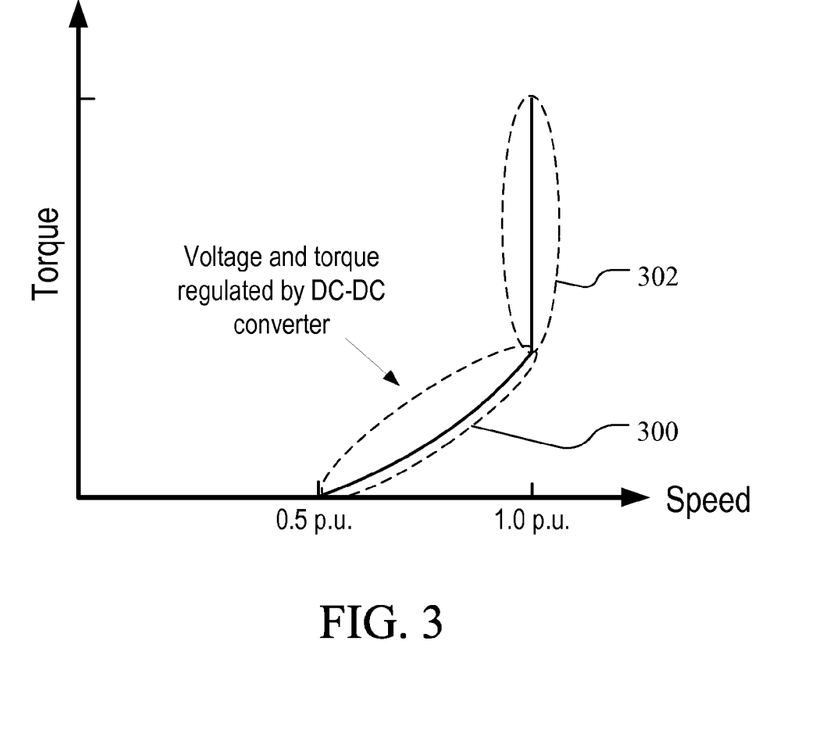
FIG. 3 is a graph showing a plot of torque versus speed for an electrical machine according to an embodiment of the subject matter described herein.

FIG. 3 is a graph showing a plot of torque versus speed for an electrical machine according to an embodiment of the subject matter described herein, such as electrical machine 100 in FIG. 1. This graph shows that the electrical machine begins to generate torque starting from 50% of its rated speed, increasing non-linearly until the electrical machine reaches 100% of its rated speed, at which point torque quickly reaches its maximum. The dotted ellipse 300 shows the portion of operation during which time voltage and torque is regulated by a DC-DC converter, such as converter 114 in FIG. 1. The dotted ellipse 302 shows the portion of operation during which DC-DC converter 114 may be bypassed, such as by closing bypass switch 120 in FIG. 1.

DC-DC converter designs may be optimized for a particular operating point or for a particular range of operation, but there are typically design trade-offs. For example, a DC-DC converter that handles large current may not have a large voltage range, and a DC-DC converter that handles large voltages may not have a large current range, and so on. Thus, in one embodiment, multiple, reconfigurable converters may be used in place of a single DC-DC converter. This is illustrated in FIGS. 4A and 4B.

Figure 4A:
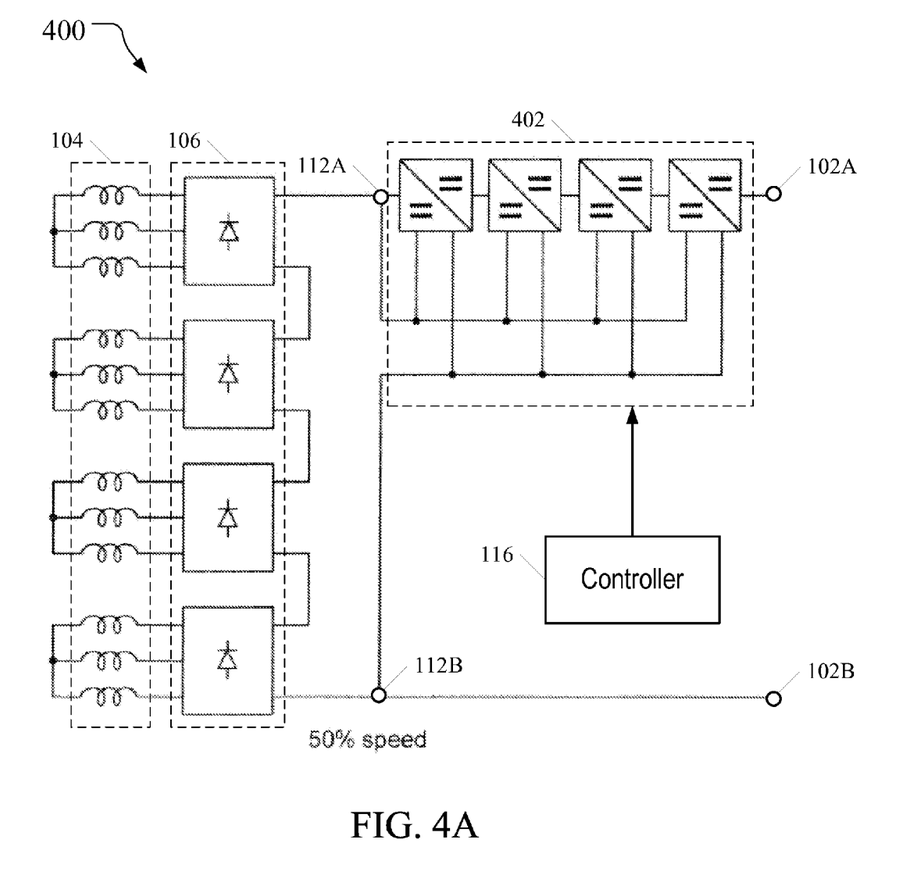
FIGS. 4A and 4B are block diagrams illustrating example configurations of an exemplary system for electrical DC generation having multiple, modularly configurable DC-DC converters according to another embodiment of the subject matter described herein.
Figure 4B:
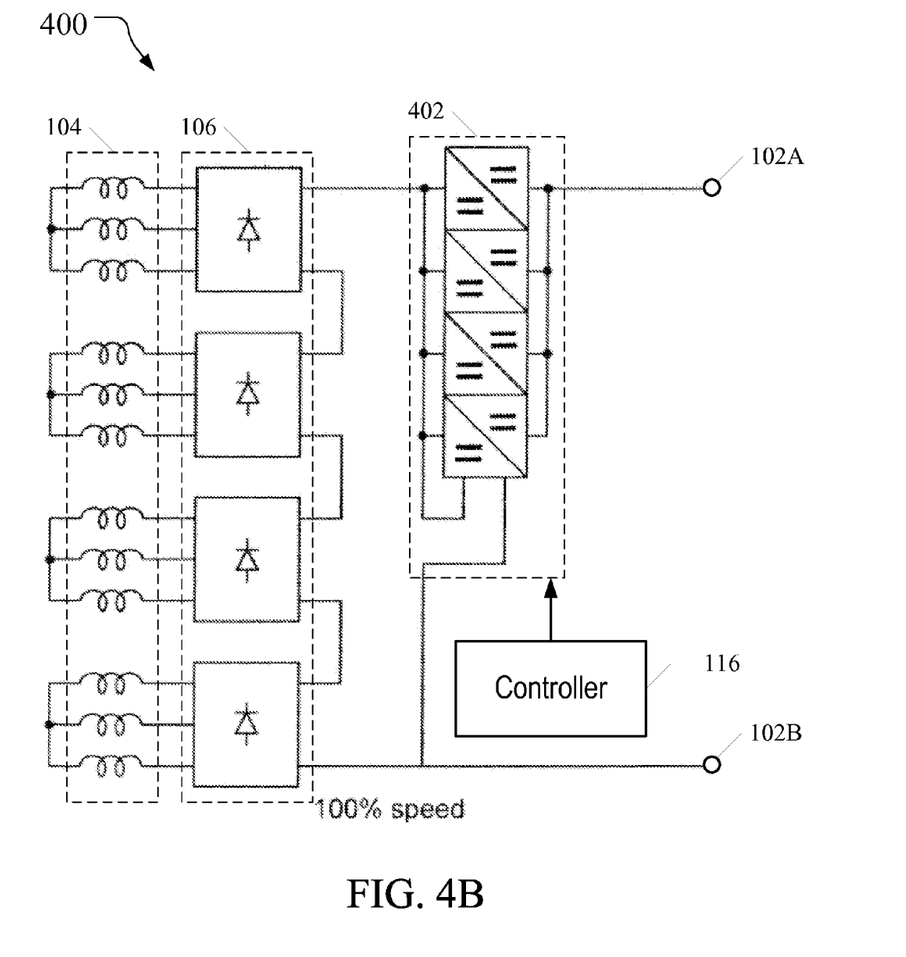

FIGS. 4A and 4B are block diagrams illustrating configurations of an exemplary system for electrical DC generation having multiple, modularly configurable DC-DC converters according to another embodiment of the subject matter described herein. In the embodiments illustrated in FIGS. 4A and 4B, electrical machine 400 includes a positive output terminal 102A and a negative output terminal 102B, multiple stator windings 104, and multiple passive rectifiers 106 connected to the stator windings 104. Rectifiers 106 are connected in series to form an intermediate bus having a positive terminal 112A and a negative terminal 112B, which is connected to negative output terminal 102B. In contrast to electrical machine 100, which includes one DC-DC converter 114, machine 400 includes a set of multiple, configurable DC-DC converters 402. In the embodiments illustrated in FIGS. 4A and 4B, for example, the set of DC-DC converters 402 includes four separate DC-DC converters, but set 402 may include 2 or more DC-DC converters. In one embodiment, electrical machine 400 may include a controller 116 for controlling the configuration of the set of DC-DC converters 402.

In one embodiment, the DC-DC converters in set 402 may be dynamically reconfigurable, e.g., they may be connected in series to provide a wide voltage range, in parallel to provide a wide current range, or some combination of the two. In the embodiment illustrated in FIG. 4A, for example, the DC-DC converters in set 402 are connected in series in order to provide a large voltage between positive terminal 112A and positive output terminal 102A. In the embodiment illustrated in FIG. 4B, on the other hand, the DC-DC converters in set 402 are connected in parallel to provide more current than the configuration shown in FIG. 4A, but less voltage. Other configurations may be implemented.

Figure 5:
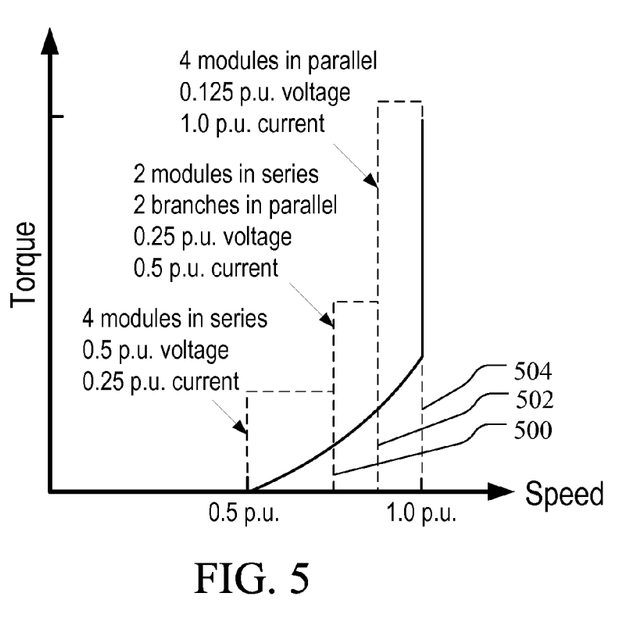
FIG. 5 is a graph showing a plot of torque versus speed for an electrical machine according to another embodiment of the subject matter described herein.

FIG. 5 is a graph showing a plot of torque versus speed for an electrical machine according to another embodiment of the subject matter described herein, such as electrical machine 400 in FIGS. 4A and 4B. This graph shows that the electrical machine begins to generate torque starting from 50% of its rated speed, increasing non-linearly until the electrical machine reaches 100% of its rated speed, at which point torque quickly reaches its maximum. FIG. 5 includes dotted boxes 500, 502, and 504 that identify portions of the speed/torque curve and that indicate a configuration that may be used for each portion.

In the embodiment illustrated in FIG. 5, for example, box 500 indicates the portion of the curve during which the DC-DC converters in set 402 may be connected in series in order to provide 0.5 percentage units (p.u.) of voltage but only 0.25 p.u. of current. Box 502 indicates the portion of the curve during which the DC-DC converters in set 402 may be connected in two parallel sets, each set having two converters in series. This configuration can produce 0.5 p.u. of current but only 0.25 p.u. of voltage. Box 504 indicates the portion of the curve during which the DC-DC converters in set 402 may be connected in parallel. This configuration can produce only 0.125 p.u. of voltage but 1.0 p.u. of current. In one embodiment of electrical machine 400, controller 116 may dynamically configure and reconfigure the DC-DC converters in set 402, e.g., by changing the number of DC-DC converters being used, the connections between them, their individual operation characteristics, and so on.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for electrical DC generation, the system comprising:
    an electrical machine, having:
        a plurality of stator windings;
        a plurality of passive rectifiers connected to the plurality of stator windings, wherein the plurality of passive rectifiers are connected in series to form an intermediate bus having a positive terminal and a negative terminal; and
        a DC-DC converter circuit having input terminals connected in parallel to the positive and negative terminals of the intermediate bus and having output terminals electrically isolated from the input terminals and connected in series with the intermediate bus;
        wherein the DC-DC converter output voltage is adjusted to regulate torque of the electrical machine by adjusting stator current of the electrical machine.

2. The system of claim 1 comprising a hardware controller for adjusting DC-DC converter output voltage based on electrical machine operating conditions.

3. The system of claim 1 wherein the torque of the electrical machine is adjusted to provide maximum power output based on a rotor speed.

4. The system of claim 3 comprising a controller for adjusting the torque of the electrical machine according to a maximum power point tracking algorithm.

5. The system of claim 1 wherein at least one of the plurality of passive rectifiers comprises at least one of:
    a passive device; and
    a half-controlled device.

6. The system of claim 1 comprising an electrical bypass switch connected between the output terminals of the DC-DC converter.

7. The system of claim 6 wherein in the closed position the switch bypasses the DC-DC converter and wherein in the open position the switch does not bypass the DC-DC converter.

8. The system of claim 6 wherein the switch is set to the closed position when the electrical machine is operating above a threshold speed.

9. The system of claim 1 comprising a plurality of DC-DC converters operating together.

10. The system of claim 1 wherein there is phase difference between stator windings.

11. The system of claim 1 wherein at least one of the plurality of stator windings comprises one of:
   a single phase winding;
   a three phase winding; and
   a winding having more than three phases.

12. The system of claim 1 wherein at least one of the plurality of stator windings comprises one of:
   a winding having integer slots per pole per phase; and
   a winding having fractional slots per pole per phase.

13. The system of claim 1 wherein the electrical machine comprises one of:
   a field wound synchronous electrical machine;
   a permanent magnet electrical machine;
   a self-excited squirrel cage induction electrical machine;
   a doubly-fed induction electrical machine; and
   a DC machine.

14. A system for electrical DC generation, the system comprising:
   an electrical machine, having:
      a plurality of stator windings;
      a plurality of passive rectifiers connected to the plurality of stator windings, wherein the plurality of passive rectifiers are connected in series to form an intermediate bus having a positive terminal and a negative terminal;
      a DC-DC converter circuit having input terminals connected to the positive and negative terminals of the intermediate bus and having output terminals electrically isolated from the input terminals and connected in series with the intermediate bus; and
      an electrical bypass switch connected between the output terminals of the DC-DC converter, wherein the switch is set to the closed position when the electrical machine is operating above a threshold speed;
   wherein the DC-DC converter output voltage is adjusted to regulate torque of the electrical machine by adjusting stator current of the electrical machine; and
   wherein one or more half-controlled devices in the rectifier are used to adjust the torque of the electrical machine when the DC-DC converter is bypassed.

15. The system of claim 14 wherein the plurality of DC-DC converters are reconfigurable to achieve a desired one of a plurality of different voltage or current ratings.

16. A method for electrical DC generation, the method comprising:
   providing, at an electrical machine: a positive output terminal and a negative output terminal; a plurality of stator windings; a plurality of passive rectifiers connected to the plurality of stator windings, the plurality of rectifiers being connected in series to form an intermediate bus having a positive terminal and a negative terminal; and a DC-DC converter circuit having input terminals connected in parallel to the positive and negative terminals of the intermediate bus and having output terminals electrically isolated from the input terminals and connected in series with the intermediate bus; and
   adjusting the DC-DC converter output voltage to regulate torque of the electrical machine by adjusting stator current of the electrical machine.

17. The method of claim 16 comprising using a hardware controller for adjusting DC-DC converter output voltage based on electrical machine operating conditions.

18. The method of claim 16 wherein the torque of the electrical machine is adjusted to provide maximum power output based on a rotor speed.

19. The method of claim 18 wherein the torque of the electrical machine is adjusted according to a maximum power point tracking algorithm.

20. The method of claim 16 wherein at least one of the plurality of passive rectifiers comprises at least one of:
   a passive device; and
   a half-controlled device.

21. The method of claim 16 comprising an electrical bypass switch connected between the output terminals of the DC-DC converter.

22. The method of claim 21 wherein in the closed position the switch bypasses the DC-DC converter and wherein in the open position the switch does not bypass the DC-DC converter.

23. The method of claim 21 wherein the switch is set to the closed position when the electrical machine is operating above a threshold speed.

24. The method of claim 16 comprising a plurality of DC-DC converters operating together.

25. The method of claim 24 wherein the plurality of DC-DC converters are reconfigurable to achieve a desired one of a plurality of different voltage or current ratings.

26. The method of claim 16 wherein at least one of the plurality of stator windings comprises one of:
   a single phase winding;
   a three phase winding; and
   a winding having more than three phases.

27. The method of claim 16 wherein at least one of the plurality of stator windings comprises one of:
   a winding having integer slots per pole per phase; and
   a winding having fractional slots per pole per phase.

28. The method of claim 16 wherein the electrical machine comprises one of:
   a field wound synchronous electrical machine;
   a permanent magnet electrical machine;
   a self-excited squirrel cage induction electrical machine;
   a doubly fed induction electrical machine; and
   a DC machine.

29. A method for electrical DC generation, the method comprising:
   providing, at an electrical machine: a positive output terminal and a negative output terminal; a plurality of stator windings; a plurality of passive rectifiers connected to the plurality of stator windings, the plurality of rectifiers being connected in series to form an intermediate bus having a positive terminal and a negative terminal; and a DC-DC converter circuit having input terminals connected to the positive and negative terminals of the intermediate bus and having output terminals electrically isolated from the input terminals and connected in series with the intermediate bus; and
   adjusting the DC-DC converter output voltage to regulate torque of the electrical machine by adjusting stator current of the electrical machine;
   wherein one or more half-controlled devices in the rectifier are used to adjust the torque of the electrical machine when the DC-DC converter is bypassed.

* * * * *